(12) United States Patent
Marshall

(10) Patent No.: US 6,735,163 B2
(45) Date of Patent: May 11, 2004

(54) ULTRA-HIGH DENSITY STORAGE DEVICE WITH RESONANT SCANNING MICROMOVER

(75) Inventor: Daniel R. Marshall, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 09/797,726

(22) Filed: Mar. 2, 2001

(65) Prior Publication Data

US 2002/0122373 A1 Sep. 5, 2002

(51) Int. Cl.$^7$ ................................................ G11B 7/00
(52) U.S. Cl. ..................... 369/126; 369/101; 250/306
(58) Field of Search ................................. 369/126, 101, 369/275.1, 275.2, 284, 288, 13.38; 250/306, 307; 365/218, 237, 151

(56) References Cited

U.S. PATENT DOCUMENTS

| | | | |
|---|---|---|---|
| 5,557,596 A | * 9/1996 | Gibson et al. | 369/101 |
| 5,920,336 A | 7/1999 | Lawton et al. | 347/255 |
| 5,929,892 A | 7/1999 | Towner et al. | 347/255 |
| 6,473,388 B1 | * 10/2002 | Gibson | 369/126 |
| 6,507,552 B2 | * 1/2003 | Gibson | 369/126 |

* cited by examiner

*Primary Examiner*—Muhammad Edun

(57) ABSTRACT

A storage device including many field emitters in close proximity to a storage medium, and a micromover, all in a partial vacuum. Each field emitter can generate an electron beam current. The storage medium has many storage areas on it, with each field emitter responsible for a number of storage areas. Also, each storage area can be in a number of different states to represent the information stored in that area. In storing information to the storage device, the power density of an electron beam current is increased to change the state of the storage area bombarded by the electron beam current. In reading information from the device, the power density of the electron beam current is reduced to generate a signal current from the storage area bombarded by the electron beam current. During reading, the power density is selected to be low enough so that no writing occurs. The magnitude of the signal current depends on the state of the storage area. The information stored in the storage area is read by measuring the magnitudes of the signal current. The micromover scans the storage medium with respect to the field emitters so that each field emitter can access many storage areas. The micromover causes a periodic change in the relative positions between the field emitters and the storage medium, thereby generating periodic field emitter trajectories.

33 Claims, 17 Drawing Sheets

ULTRA-HIGH DENSITY STORAGE DEVICE WITH RESONANT SCANNING MICROMOVER

FIELD OF THE INVENTION

The present invention relates generally to storage devices, and more particularly to storage devices based on field emitters.

BACKGROUND OF THE INVENTION

For decades, researchers have been trying to increase the storage density and reduce the cost/storage in information storage devices, such as magnetic hard-drives, optical drives, and DRAM. However, it has become increasingly difficult to squeeze more information into the storage devices. Moreover, conventional technologies to make those devices may be approaching fundamental limits on storage density.

Many scientists have proposed alternative approaches to increase the storage density. One approach is based on Scanned Probe Microscopy (SPM) technologies. Typically, in such an approach, a probe is positioned extremely close to a storage medium. For example, in one implementation of Atomic Force Microscopy, the probe physically touches the medium; in Scanning Tunneling Microscopy (STM), the probe is within a few nanometers of the medium to ensure that the probe is within tunneling range of the medium. It is difficult to inexpensively build a storage system with a probe in contact with or in such extremely close proximity to the medium without, eventually, damaging or effacing the surface of the medium or the probe. Moreover, in STM, the nanometer spacing must be precisely controlled. This is a difficult task. Some researchers have found methods to eliminate the need for such extremely close proximity. One technique is based on Near-Field Scanning Optical Microscopy. However, this technique has limited lateral resolution and bandwidth. Other techniques are based on non-contact Scanning Force Microscopy, which typically suffers from poor resolution and poor signal to noise ratio.

Even if one has increased the storage density, one still has to overcome another major hurdle, which is the time required to access the information. The storage device's utility is limited if it takes a long time to retrieve the stored information. In other words, in addition to high storage density, one must find a way to quickly access the information.

It should be apparent from the foregoing that there is still a need for a storage device that is based on a non-conventional approach, with significantly increased storage density, and low cost/storage. Additionally, the storage device preferably should have fast access times and high data rates. Furthermore, the storage device should preferably eliminate the requirement for extremely close proximity between the probe and storage medium.

SUMMARY OF THE INVENTION

The present invention provides a storage device that includes a field emitter for generating an electron beam current. A storage medium is located in close proximity to the field emitter with the storage medium having a plurality of storage areas for storage. The storage areas can be in one of a plurality of states that represent the information stored in those storage areas. An effect is generated when the electron beam current bombards a storage area. The magnitude of the effect depends on the state of the bombarded storage area, with the information stored in the bombarded storage area being determined by measuring the magnitude of the effect. A micromover causes a periodic change in the relative positions between the field emitter and the storage medium, thereby generating a periodic field emitter trajectory.

DESCRIPTION OF THE PREFERRED EMBODIMENTS

Figure 1A:
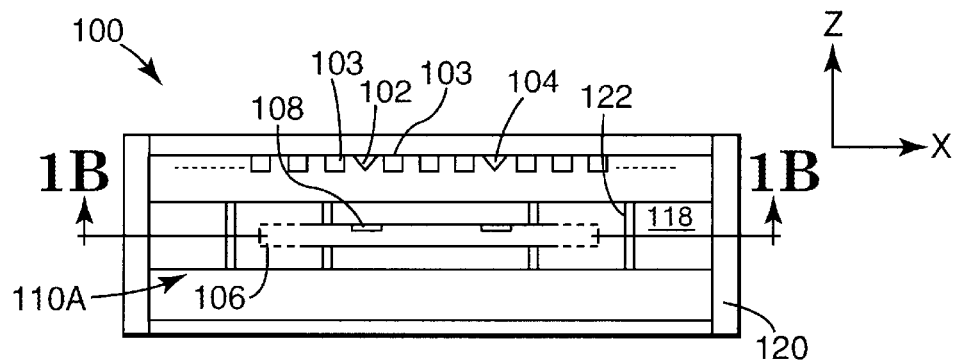
FIG. 1A is cross-sectional view of one embodiment of a storage device according to the present invention.

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Gibson et al., U.S. Pat. No. 5,557,596, herein incorporated by reference, describes an ultra-high density storage device. In one embodiment, the storage medium described in Gibson et al. is divided into a two-dimensional X-Y grid of storage areas. For a storage device that uses a two-dimensional X-Y grid of storage areas, a micromover can be used to move the storage medium and a read/write element relative to each other in discrete steps in X and Y directions, to access the various storage areas. Such discrete movements may be accomplished with electro-static stepper motors. For each move of the read/write element to a new position, the stepper motor must accelerate the element, reach a particular velocity, decelerate, and then stop, typically in two degrees of freedom.

In addition, for a storage device that uses a two-dimensional X-Y grid of storage areas, each storage area typically stores one bit of data. However, most real data is seldom just a single bit. Rather, it is usually made up of many bits in a standard sequence. The actions of starting, accelerating, decelerating and stopping for each bit of data in a sequence of data results in slow movement and long access times. Further, by limiting movement of the read/write element to discrete positions, pulse width modulation (PWM) techniques cannot be used.

The sequential nature of data tends to constrain the kind of motion algorithms used for a particular application. In a hard disk drive, for example, data is usually located in concentric tracks, laid down around a disk that spins. Locating a particular sequence of bits requires that a motion controller move the heads for reading and writing to a particular radial location, then wait for a selected sequence to appear as the disk spins—usually at a constant angular velocity. In contrast, in compact disk recording, a spiral path is traced outward from an inner radius of the disk, at a constant linear velocity (the angular velocity decreases with increasing radius). The difference between these two motion algorithms results mainly from the fact that compact disk players are optimized for very long sequences of bits, whereas disk drives usually respond to requests for data patterns of widely varying length. It is evident that optimizing movement patterns to store sequences of bits in an X-Y array of storage areas is very important in optimizing the performance of a storage device.

One potential movement technique is to produce periodic trajectories of a read/write element with respect to the storage medium. Lawton et al, U.S. Pat. No. 5,920,336, herein incorporated by reference, discloses a beam deflecting method for resolution enhancement and banding reduction in a laser printer. In one embodiment, beam deflectors are used to produce a periodic trajectory of a laser beam in a laser printer.

The X-Y nature of a storage device like that disclosed in Gibson et al. imposes certain opportunities and constraints on the motion control algorithms that can be used. It would be desirable for an ultra-high density storage device to make use of a movement mechanism, such as a periodic trajectory movement mechanism, that uses energy efficiently, uses low power, produces little heat dissipation, minimizes the accelerations and velocities required for efficient seeks to locations where data is stored, produces fast recording, makes use of more memory sites or storage areas, and provides continuous positioning so that techniques such as PWM may be used.

FIG. 1A illustrates a side cross-sectional view of one embodiment of a storage device 100. Storage device 100 includes a number of field emitters, such as field emitters 102 and 104, a storage medium 106 including a number of storage areas, such as storage area 108, and micromover 110A. Micromover 110A scans storage medium 106 with respect to the field emitters 102 and 104 or vice versa. In one preferred embodiment, each storage area 108 is responsible for storing one bit of information.

In one embodiment, field emitters 102 and 104, are point emitters having relatively sharp points. Each point emitter may have a radius of curvature in the range of approximately 1 nanometer to hundreds of nanometers. During operation, a pre-selected potential difference is applied between a field emitter and its corresponding gate, such as between field emitter 102 and circular gate 103 surrounding it. Due to the sharp point of the emitter, an electron beam current is extracted from the emitter towards storage area 108. Depending on the distance between the emitters and the storage medium 106, the type of emitters, and the spot size (bit size) required, electron optics may be utilized to focus the electron beams. A voltage may also be applied to the storage medium 106 to either accelerate or decelerate the field-emitted electrons or to aid in focusing the field-emitted electrons.

In one embodiment, casing 120 maintains storage medium 106 in a partial vacuum, such as at least 10-5 torr. It is known in the art to fabricate such types of microfabricated field emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

In one embodiment shown in FIG. 1A, each field emitter 102 and 104 has a corresponding storage area 108. In another embodiment, each field emitter 102 and 104 is responsible for a number of storage areas 108. As micromover 110A moves storage medium 106 to different locations, each emitter 102 and 104 is positioned above different storage areas 108. With micromover 110A, an array of field emitters can scan over storage medium 106.

Micromover 110A must have sufficient range and resolution to position field emitters 102 and 104 over storage areas 108. In one embodiment, micromover 110A is fabricated by a standard semiconductor microfabrication process to scan storage medium 106 in the X and Y directions with respect to casing 120. Rather than making direct or linear moves in the X and Y directions, or in addition to such linear moves, micromover 110A moves storage medium 106 in a periodic trajectory as described below.

As will be described, field emitters 102 and 104 are responsible to read and write information on storage areas 108 by means of the electron beams they produce. Thus, field emitters suitable for use in storage device 100 are of the type that can produce electron beams that are narrow enough to achieve the desired bit density on the storage medium, and can provide the power density of the beam current needed for reading from and writing to the medium. A variety of ways are known in the art that are suitable to make such field emitters. For example, one method is disclosed in "Physical Properties of Thin-Film Field Emission Cathodes With Molybdenum Cones," by Spindt et al, published in the Journal of Applied Physics, Vol. 47, No. 12, December 1976. Another method is disclosed in "Fabrication and Characteristics of Si Field Emitter Arrays," by Betsui, published in Tech. Digest 4$^{th}$ Int. Vacuum Microelectronics Conf., Nagahama, Japan, page 26, 1991.

In one embodiment, there is a two-dimensional array of emitters, such as 100 by 100 emitters, with an emitter pitch of 50 micrometers in both the X and the Y directions. Each emitter may access bits in tens of thousands to hundreds of millions of storage areas. For example, the emitters scan over the storage areas with a periodicity of about 1 to 100 nanometers between any two storage areas. Also, all of the emitters may be addressed simultaneously or in a multiplexed manner. Such a parallel accessing scheme significantly reduces access time, and increases data rate of the storage device.

Figure 1B:
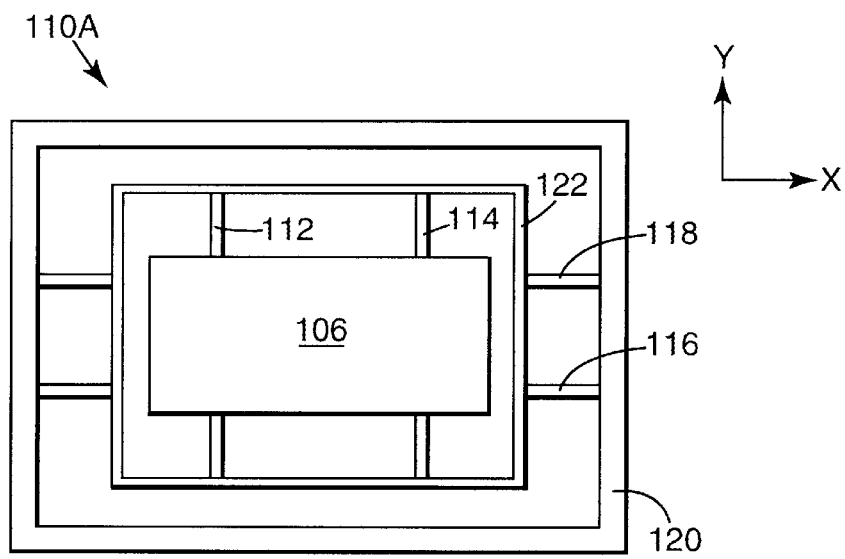
FIG. 1B is a top cross-sectional view of the storage device of FIG. 1A taken along lines 1B—1B from FIG. 1A.

FIG. 1B shows the top view of the cross section 1B—1B in FIG. 1A, illustrating micromover 110A. Micromover 110A includes beams 112, 114, 116 and 118, casing 120 and frame 122. Micromover 110A also includes control circuit 110C (shown in FIG. 2). Storage medium 106 is held by two sets of thin-walled microfabricated beams or flexures. The faces of the first set of thin-walled beams are in the Y-Z plane, such as beams 112 and 114. Thin-walled beams 112 and 114 may be flexed in the X direction allowing storage medium 106 to move in the X direction with respect to casing 120. The faces of the second set of thin-walled beams are in the X-Z plane, such as beams 116 and 118. Thin-walled beams 116 and 118 allow storage medium 106 to move in the Y direction with respect to casing 120. Storage medium 106 is held by the first set of beams 112 and 114, which are connected to frame 122. Frame 122 is held by the second set of beams 116 and 118, which are connected to casing 120. The field emitters 102 and 104 scan over storage medium 106, or storage medium 106 scans over field emitters 102 and 104, in the X-Y directions by electrostatic, electromagnetic, piezoelectric, or other means known in the art. In this example, micromover 110A moves storage medium 106 relative to the field emitters 102 and 104. A general discussion of such a microfabricated micromover can be found, for example, in "Novel Polysilicon Comb Actuators for XY-Stages," published in the Proceeding of MicroElectro Mechanical Systems 1992, written by Jaecklin et al.; and in "Silicon Micromechanics: Sensors and Actuators on a Chip", by Howe et al., published in IEEE Spectrum, page 29, in July 1990.

Figure 1C:
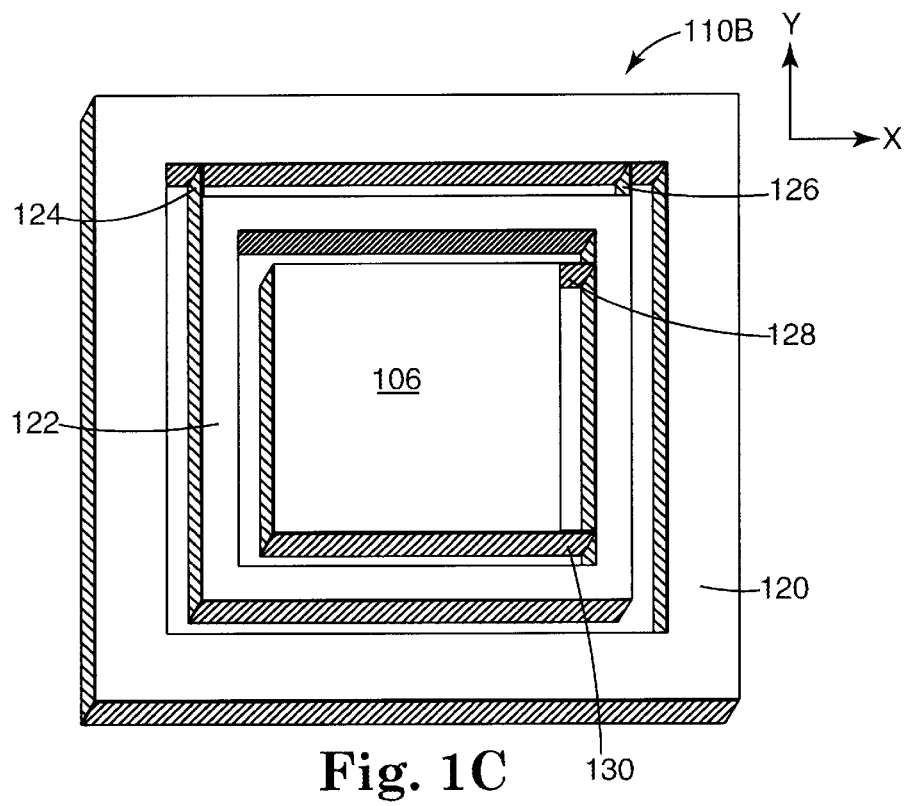
FIG. 1C is a perspective view of one embodiment of a micromover according to the present invention.

FIG. 1C shows a perspective view of an alternative embodiment of a micromover according to the present invention. Micromover 110B includes casing 120, frame 122, and flexures 124, 126, 128, and 130. Micromover 110B also includes control circuit 110C (shown in FIG. 2). Casing 120 and frame 122 are substantially the same in micromover 110B as in micromover 110A. Storage medium 106 is attached to frame 122 by flexures 128 and 130. Frame 122 is attached to casing 120 by flexures 124 and 126. Flexures 124, 126, 128, and 130 in micromover 110B are substantially the same as beams or flexures 112, 114, 116, and 118 in micromover 110A, but are positioned differently. Also, less flexures are used in micromover 110B than in micromover 110A. Casing 120 is substantially stationary. Frame 122 is movable in the X direction due to the flexibility of flexures 124 and 126. Movement of frame 122 in the X direction also causes storage medium 106 to move in the X direction. Storage medium 106 is movable in the Y direction due to the flexibility of flexures 128 and 130. Micromovers 110A and 110B are substantially the same in their operation and are referred to generally hereafter as micromover 110.

Figure 1D:
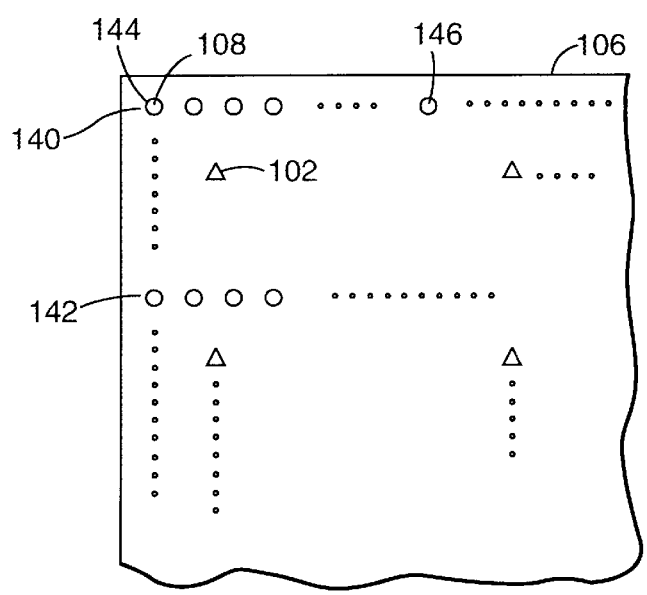
FIG. 1D is a top view of a portion of a storage medium of the storage device of FIG. 1A.

FIG. 1D shows a top view of one embodiment of storage medium 106 having a two-dimensional array of storage areas 108 and a two-dimensional array of emitters 102. Addressing the storage areas 108 requires external circuits. In one embodiment, to reduce the number of external circuits, storage medium 106 is separated into rows, such as rows 140 and 142, where each row contains a number of storage areas 108. Each emitter 102 is responsible for a number of rows. However, in this embodiment, each emitter 102 is not responsible for the entire length of the rows. For example, a first emitter 102 is responsible for the storage areas within rows 140 through 142, and within columns 144 through 146. All rows of storage areas 108 accessed by one emitter 102 are connected to one external circuit. To address a storage area 108, the emitter 102 responsible for that storage area 108 is activated and micromover 110 moves that emitter 102 to that storage area 108. The external circuit connected to the rows of storage areas within which that storage area lies is also activated.

Rather than making linear moves in the X and Y directions, or in addition to such linear moves, micromover 110 moves storage medium 106 in a periodic trajectory. To provide a periodic trajectory, flexures 112, 114, 116, and 118 in micromover 110A, and flexures 124, 126, 128, and 130 in micromover 110B are preferably made of silicon, which is a stiff material that provides good spring action. Other materials may be used for the flexures. The flexures are excited by control circuit 110C (shown in FIG. 2) to cause periodic motion of storage medium 106, and thereby position emitters 102 and 104 over a desired set of storage areas 108. In one embodiment, the position of emitters 102 and 104 are monitored during the periodic movement to determine the current position of emitters 102 and 104 relative to the center of the storage areas 108, or relative to some other reference point.

In one embodiment, emitters 102 and 104 are caused to move in a periodic trajectory with respect to storage medium 106, rather than storage medium 106 being moved with respect to emitters 102 and 104. In another embodiment, both the emitters 102 and 104, and the storage medium 106 are moved. It will be understood that whether the emitters are moved with respect to the storage medium, whether the storage medium is moved with respect to the emitters, or whether both the emitters and the storage medium are moved, it is the relative movement between the two that is important. The trajectory that is traced out by emitters 102 and 104 with respect to storage medium 106 will be referred to as the emitter trajectory, regardless of whether emitters 102 and 104 are being physically moved, whether storage medium 106 is being physically moved, or whether both storage medium 106 and emitters 102 and 104 are moved.

In one embodiment, the emitter trajectory is periodic in both the X and the Y direction. In alternative embodiments, the emitter trajectory is periodic in one dimension and static in a second dimension, or periodic in one dimension with linear movements in a second dimension. The periodic movements can be used in combination with linear movements to produce virtually any type of emitter trajectories, including circles, ellipses, spirals, figure 8s, or other shapes, as will be discussed further below.

Figure 2:
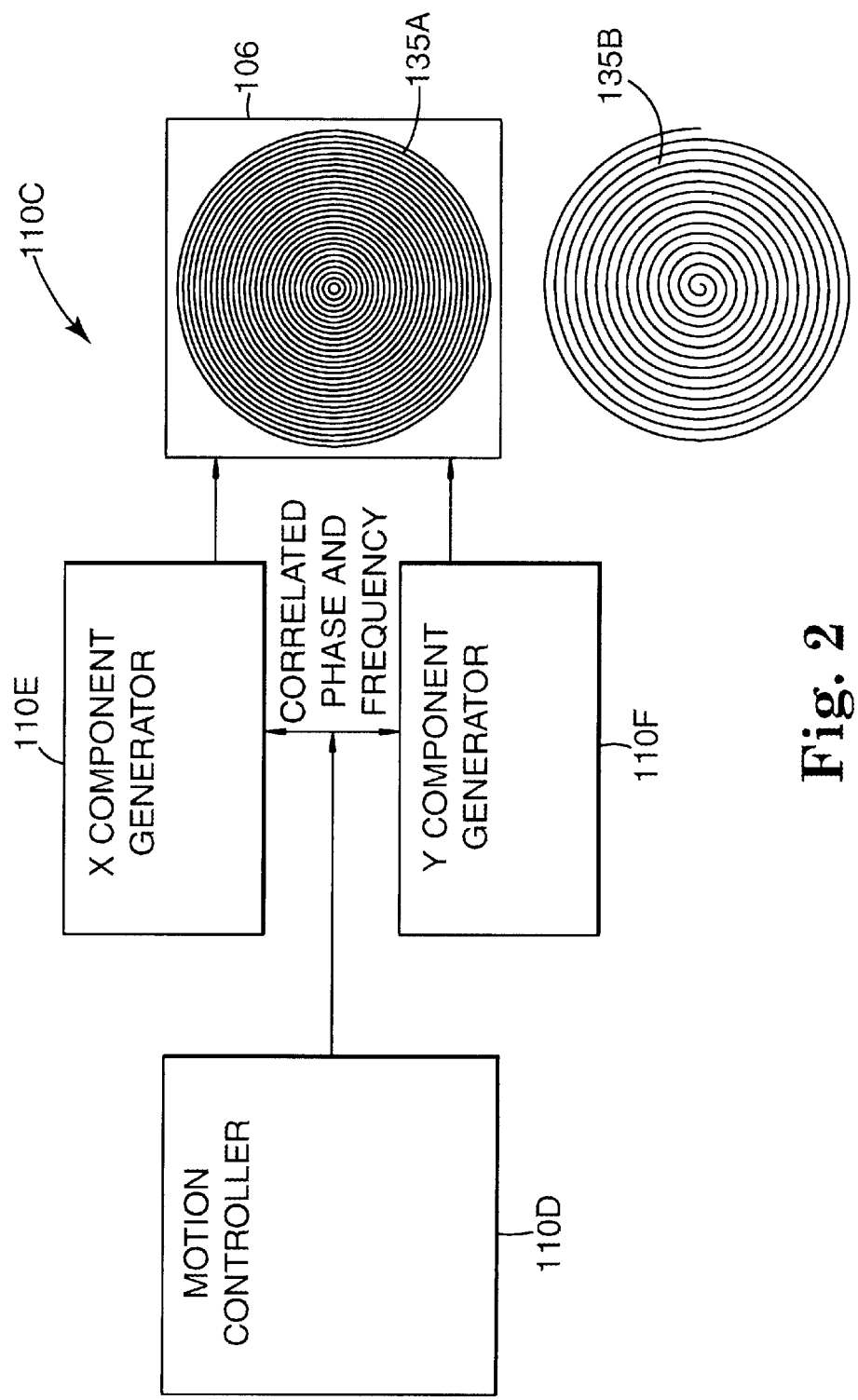
FIG. 2 is a block diagram of one embodiment of a control circuit used in the storage device of the present invention.

FIG. 2 shows a block diagram of control circuit 110C. Control circuit 110C includes motion controller 110D, X component generator 110E, and Y component generator 110F. X component generator 110E and Y component generator 110F are controlled by motion controller 110D, and are coupled to storage medium 106. In one embodiment, generators 110E and 110F are coupled to emitters 102 and 104. Each degree-of-freedom represented by the X and Y axes in FIG. 1B can be excited by a sinusoidally varying force characterized by a frequency, amplitude and phase. As long as certain conditions are met, the resulting motion of storage medium 106 will also be sinusoidal—that is, the X position, plotted as a function of time, will closely approximate the following Equation I:

Equation I $$X = A_x \sin(2\pi f_x t + \phi_x)$$

wherein:

X represents the position in one dimension (along the X-axis) of storage medium 106;

$A_x$ represents the X amplitude, in units of length;

$\pi$ is a constant with its usual value, 3.14159 . . . ;

$f_x$ represents the X frequency, in Hz (cycles per second);

t represents time, in seconds; and $\phi_x$ represents an arbitrary phase constant for X.

By constructing storage device 100 such that the second degree of freedom is substantially independent of the first degree of freedom, a similar equation holds for the second degree of freedom, but with its own independent amplitude, frequency and phase. The motion of storage medium 106 in the second degree of freedom (i.e., along the Y-axis) is represented by Equation II:

Equation II $$Y = A_y \sin(2\pi f_y t + \phi_y)$$

wherein:

Y represents the position in a second dimension (e.g., along the Y-axis) of storage medium 106;

$A_y$ represents the Y amplitude, in units of length;

$\pi$ is a constant with its usual value, 3.14159 . . . ;

$f_y$ represents the Y frequency, in Hz (cycles per second);

t represents time, in seconds; and $\phi_y$ represents an arbitrary phase constant for Y.

X-component generator 110E generates a sinusoidal waveform represented by Equation I under the control of motion controller 110D. Y-component generator 110F generates a sinusoidal waveform represented by Equation II under the control of motion controller 110D. Motion controller 110D controls the amplitude, phase and frequency of waveforms generated by generators 110E and 110F, and correlates the frequency and phase of the waveforms. In addition to sinusoidal waveforms, motion controller 110D can cause generators 110E and 110F to output other waveform shapes. Control circuits for generating X and Y waveforms with independently and simultaneously variable amplitude, frequency and phase are well known to those of ordinary skill in the art of motion control.

The periodic emitter trajectories caused by the relative motion between emitters 102 and 104 and storage medium 106, in general, trace out a curved path. Motion controller 110D, which is also responsible for read/write timing, samples or writes to storage medium 106 at appropriate times to access a regular grid of storage areas 108 on storage medium 106. Using the periodic emitter trajectories of the present invention and appropriate read/write timing, rectilinear grids of storage areas, including rectangular grids with uniform spacing of the storage areas 108 in the X and Y directions, can be accessed. Since a read or write operation may or may not occur at a given storage area location, grid locations are referred to as "available storage area locations".

When the frequency and the phase of the X and Y motions are correlated by motion controller 110D, the result is a family of curves or emitter trajectories called "Lissajous" figures. These figures can be used to generate a quasi-periodical array of points, without requiring the large acceleration and deceleration associated with point-to-point movements. The lowest frequency spectrum provides circular or elliptical emitter trajectories. A reduced spectral signature reduces power, acceleration and electrical noise. By selectively adding higher odd harmonics to the exciting waveforms, the emitter trajectories may be "squared up", improving the rectilinearity of the trajectories, while still using a modest spectral bandwidth.

The simplest Lissajous figure is a circle, which is a special case of an ellipse. FIG. 2 shows a circular emitter trajectory 135A positioned over storage medium 106. Circular trajectories like those found in a disk drive can be produced by matching the frequencies used for X and Y excitation. The size of the circular emitter trajectory 135A is adjusted by motion controller 110D by simultaneously changing $A_x$ and $A_y$. As a result, storage device 100 emulates a disk drive trajectory. In addition, the present invention can eliminate the latency inherent in the read/write operations of a disk drive. In a disk drive, there is a latency or waiting period for the disk to rotate around until a desired point on the disk reaches the read/write head. In the present invention, micromover 110 can move emitters 102 and 104 directly to recorded bits. Thus, periodic trajectories may be used to record a string of data, and linear moves may be used to access certain elements of the data.

If the values of $A_x$ and $A_y$ change continuously, a spiral emitter trajectory 135B is produced. Thus, spiral trajectories like those produced by a compact disk can be generated, which can be used for longer data records.

Hereafter, when referring to a specific type of emitter trajectory, the reference number "135" followed by an appended letter is used to identify the particular trajectory. When referring to all emitter trajectories generally, the reference number "135" is used with no appended letter.

The use of a circular or elliptical emitter trajectories 135 provides an economical way to record large amounts of data (e.g., for backup operations). The domain of storage areas 108 in storage medium 106 may be filled out by increasing or decreasing the amplitude of oscillation, and thereby increasing or decreasing the radius of the circular or elliptical trajectory of emitters 102 and 104.

An additional benefit provided by periodic trajectories is that reading and writing can be done in a straightforward manner while emitters 102 and 104 (or storage medium 106) are in motion. Continuous trajectories thereby allow so-called pulse-width modulation (PWM) techniques to be used, rather than, or in addition to, pulse-position techniques. Hard disk drives typically use pulse-width modulation techniques. An advantage of PWM techniques is the ability to obtain a higher density of recorded information.

In one embodiment, the frequency of oscillation of emitters 102 and 104 with respect to storage medium 106 is the resonance frequency of the oscillating structure. Mechanical structures can undergo a phenomenon known as resonance, in which a particular frequency excites larger amplitudes of motion than other frequencies. A mathematical construct called a simple harmonic oscillator illustrates an idealized version of this behavior. At its resonant frequency, which is proportional to the square root of the ratio of the spring constant to the mass, the simple harmonic oscillator has a peak amplitude of motion dependent on the amplitude of excitation and on frictional damping. In the absence of damping, the amplitude theoretically grows without limit. Thus, resonance is "peaky" ringing in response to excitation at a specific frequency.

The moving structures used in storage device 100, including storage medium 106, frame 122, flexures 112, 114, 116, and 118, and flexures 124, 126, 128, and 130, tend to behave similarly to simple harmonic oscillators. That is, the amplitude of oscillation sharply peaks at a characteristic frequency, and there tends to be little damping. Therefore, these moving structures can be kept in motion at a resonant frequency with little loss in energy. Therefore, it is desirable to use periodic emitter trajectories at the resonant frequency of the moving structures.

As shown in FIGS. 1B and 1C, the moving structures in storage device 100 include two stages—an X stage and a Y stage. The X stage provides movement of storage medium 106 in the X direction, and the Y stage provides movement of storage medium 106 in the Y direction. For micromover 110A shown in FIG. 1B, the X stage includes flexures 112 and 114, and storage medium 106. The Y stage encompasses the X stage and includes flexures 116 and 118, frame 122, flexures 112 and 114, and storage medium 106. For micromover 110B shown in FIG. 1C, the Y stage includes flexures 128 and 130, and storage medium 106. The X stage encompasses the Y stage and includes flexures 124 and 126, frame 122, flexures 128 and 130, and storage medium 106. Typically, the X and Y stages have different resonant frequencies because they have different masses. The stages have different masses because the mass of the outer stage includes the mass of the inner stage. The X and Y stages may be tuned to different resonant frequencies to generate a particular trajectory.

Figure 3:
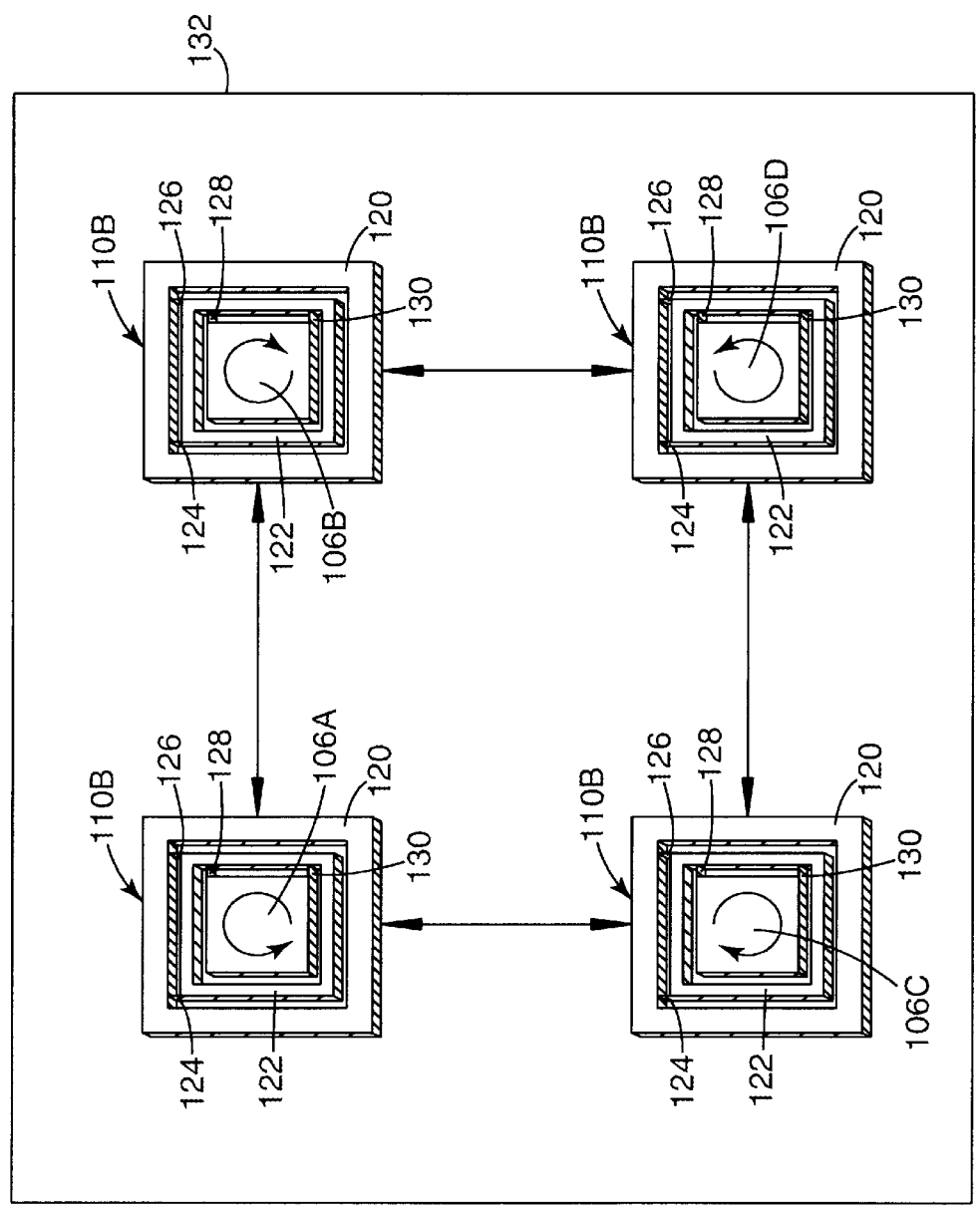
FIG. 3 is a top view of a storage medium separated into a plurality of stages according to the present invention.

FIG. 3 is a top view of a storage medium 106 separated into a plurality of stages 106A–106D according to the present invention. Each storage medium stage 106A–106D is coupled to a micromover 110. Each micromover 110 is mounted to a substrate 132. The movement of each storage medium stage 106A–106D may be separately controlled by the micromover 110 coupled to that stage. Certain of the stages 106A–106D may have similar resonant frequencies as other of the stages 106A–106D, which could cause a problem with coupling between adjacent stages, wherein the movement of one stage affects another stage. The coupling problem between adjacent stages can occur whether or not the stages are driven at their resonant frequencies, particularly since there is little damping in the structures used for storage device 100. To correct the coupling problem, each stage 106A–106D should be made substantially non-interactive with the movement of other stages. The coupling problem may be corrected by operating four actuators synchronously, that is, with four actuators simultaneously operating twice pair-wise. Thus, if stage 106A moves up, stage 106C moves down. If stage 106A moves down, stage 106C moves up. If stage 106A moves left, stage 106B moves right. If stage 106A moves right, stage 106B moves left. The other stages operate in a similar manner to counter the motions of adjacent stages, thereby making each stage 106A–106D substantially non-interactive.

Figure 4:
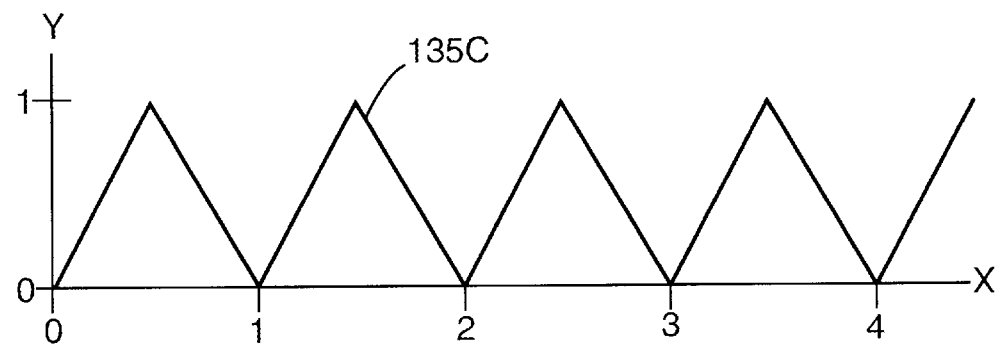
FIG. 4 is a diagram of a periodic emitter trajectory having a triangle wave shape according to the present invention.

FIGS. 4–14 illustrate additional emitter trajectories 135 that may be produced in accordance with the present invention. FIG. 4 is a diagram of a periodic emitter trajectory 135C having a triangle wave shape. To produce the triangle wave shape 135C shown in FIG. 4, Y-component generator 110F produces emitter motion in the Y direction having constant velocity but alternating direction. X-component generator 110E produces constant velocity emitter motion in the X direction.

Figure 5:
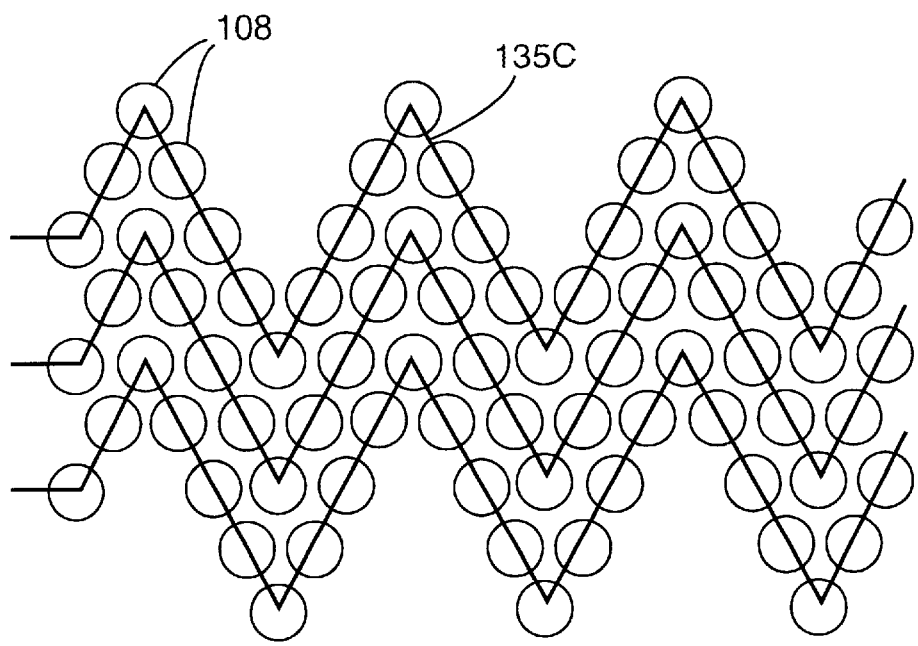
FIG. 5 is a diagram of a parallelogram grid of storage areas accessible by using the triangle wave periodic emitter trajectory of FIG. 4.

Using the triangle wave emitter trajectory 135C and appropriate read/write timing, a rectilinear grid of available storage areas 108, in this case a parallelogram grid, is accessible, as shown in FIG. 5. In FIG. 5, available storage areas 108 are marked with "O" symbols. It should be noted that the triangle emitter trajectory 135C need not be constructed of perfectly straight segments, as long as the read/write timing is executed at locations along the emitter path that conform to the desired grid of storage areas 108.

Figure 6:
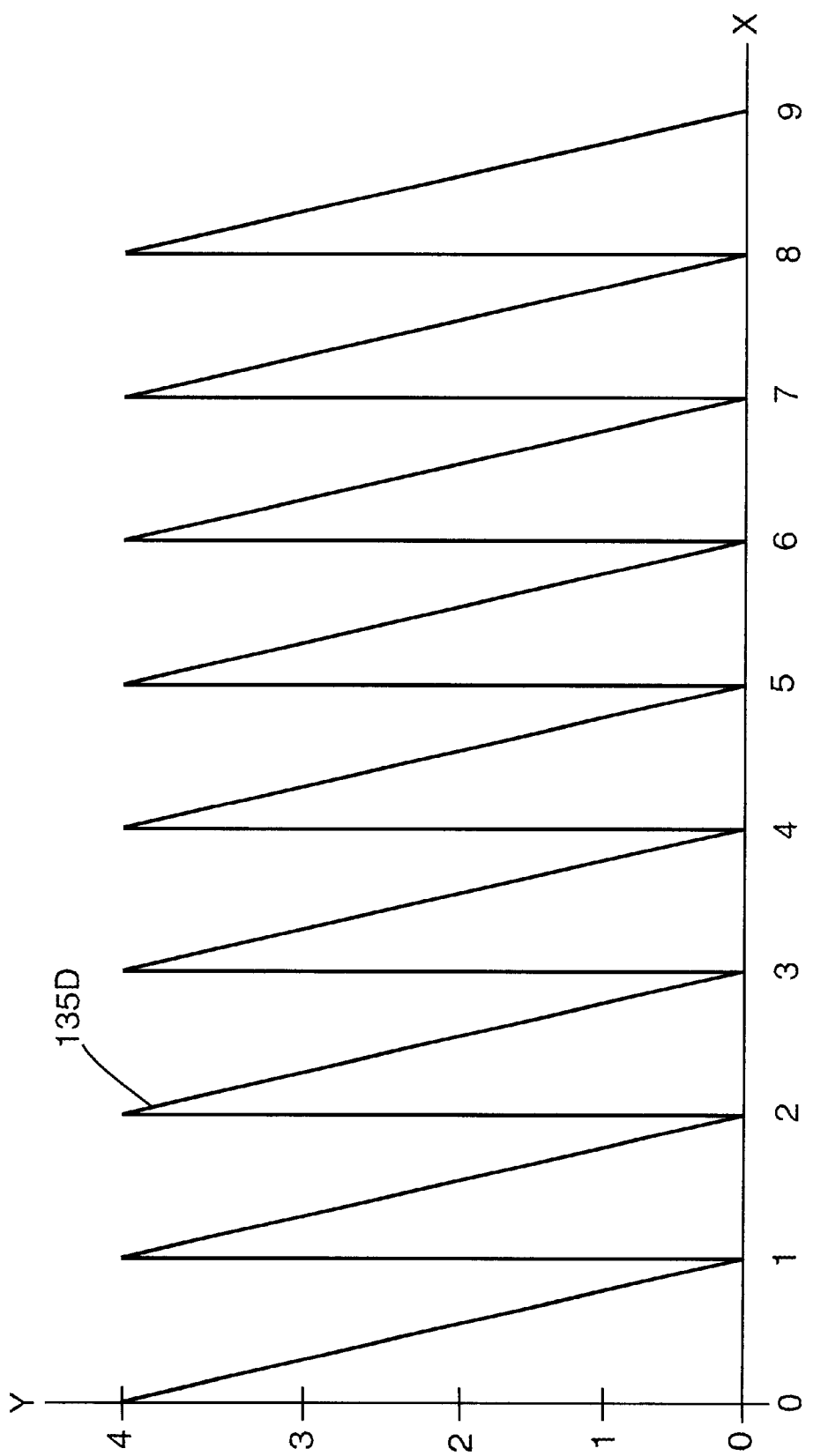
FIG. 6 is a diagram of a periodic emitter trajectory having a sawtooth wave shape according to the present invention.

FIG. 6 is a diagram of a periodic emitter trajectory having a sawtooth wave shape 135D. The combined emitter motions produced by generators 110E and 110F create a periodic emitter trajectory 135D in which the emitter moves substantially in the Y-direction with little or no movement in the X direction, at which time read or write actions are performed, and then returns along an angled path, at which time no read or write actions are performed.

Figure 7:
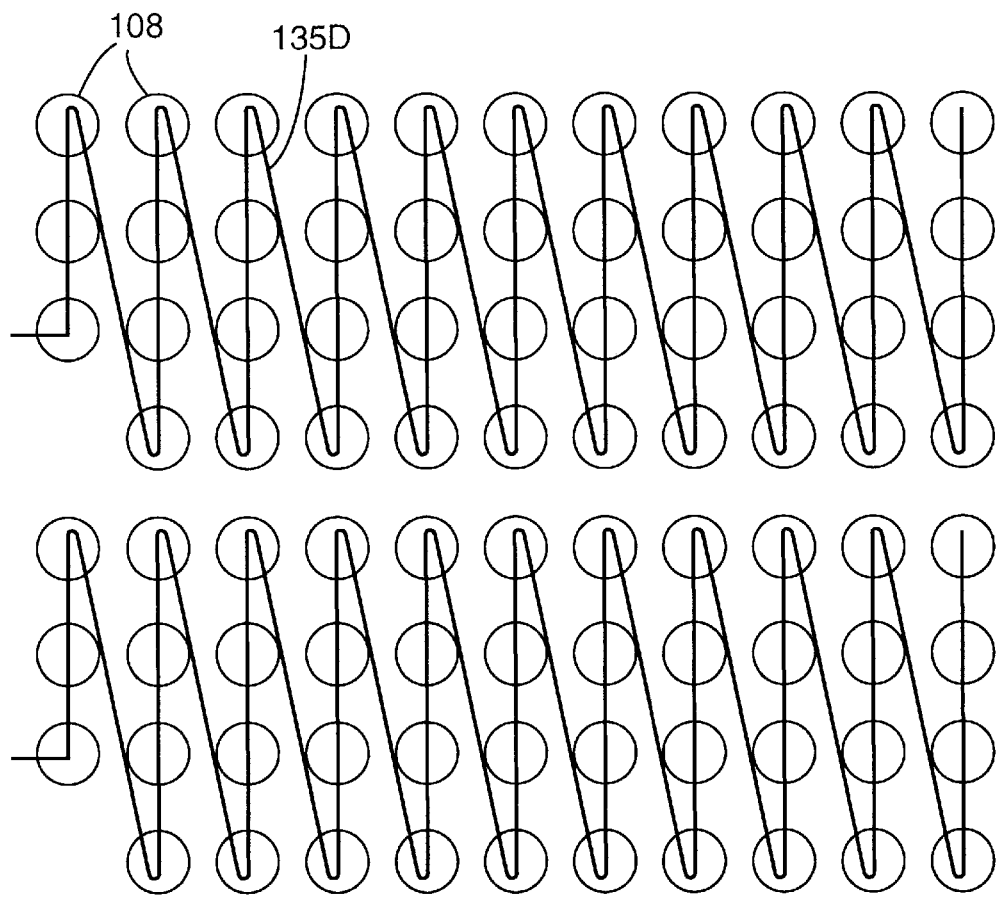
FIG. 7 is a diagram of a rectangular grid of storage areas accessible by using the sawtooth wave periodic trajectory of FIG. 6.

As shown in FIG. 7, the resulting sawtooth wave emitter periodic trajectory 135D is capable of efficiently accessing multiple rows of storage areas 108 during each pass along the X-direction, thereby accessing a rectangular grid of available storage areas 108. Again, available storage areas 108 are marked with "O" symbols in FIG. 7. The periodic signal generated by generators 110E and 110F to produce the sawtooth emitter trajectory 135D is similar to that which produced the triangle wave emitter trajectory 135C described with reference to FIGS. 4 and 5. Specifically, one ascending and one descending voltage ramp is applied by Y-component generator 110F during each cycle of the trajectory. X-component generator 110E generates movement along the X-direction during the downward Y-direction, and generates little or no movement along the X-direction during the upward Y-direction movement. It should also be noted that the emitter trajectory 135D need not be constructed of straight line segments to make this technique work, as long as some portion of the trajectory is substantially linear, or as long as the read/write operations occur at locations that conform to the desired grid of storage areas 108. Such a departure from straight lines and sharp corners is desirable for reducing the bandwidth of the signal needed to generate the emitter trajectory. Note that many variations of the sawtooth periodic trajectory 135D are possible, including those in which read and write operations occur along a portion of the trajectory that is not aligned in the Y direction.

Figure 8:
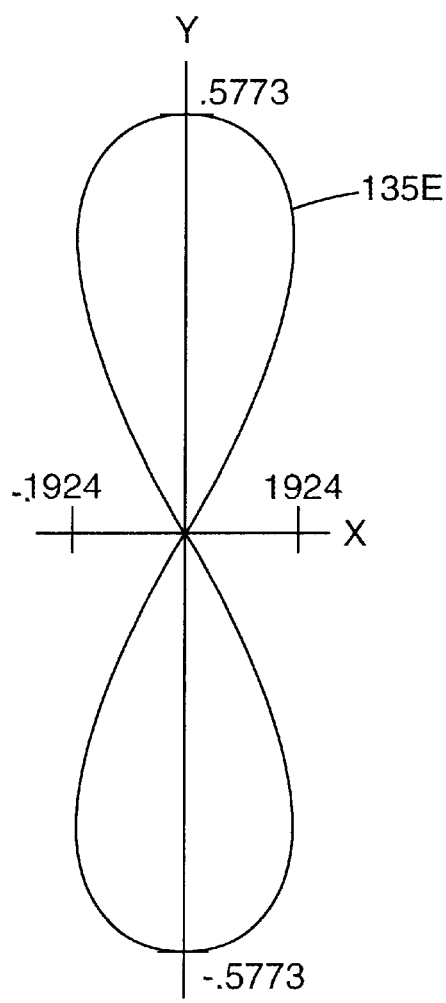
FIG. 8 is a diagram of a "figure-8" Lissajous curve produced according to the present invention.
Figure 9:
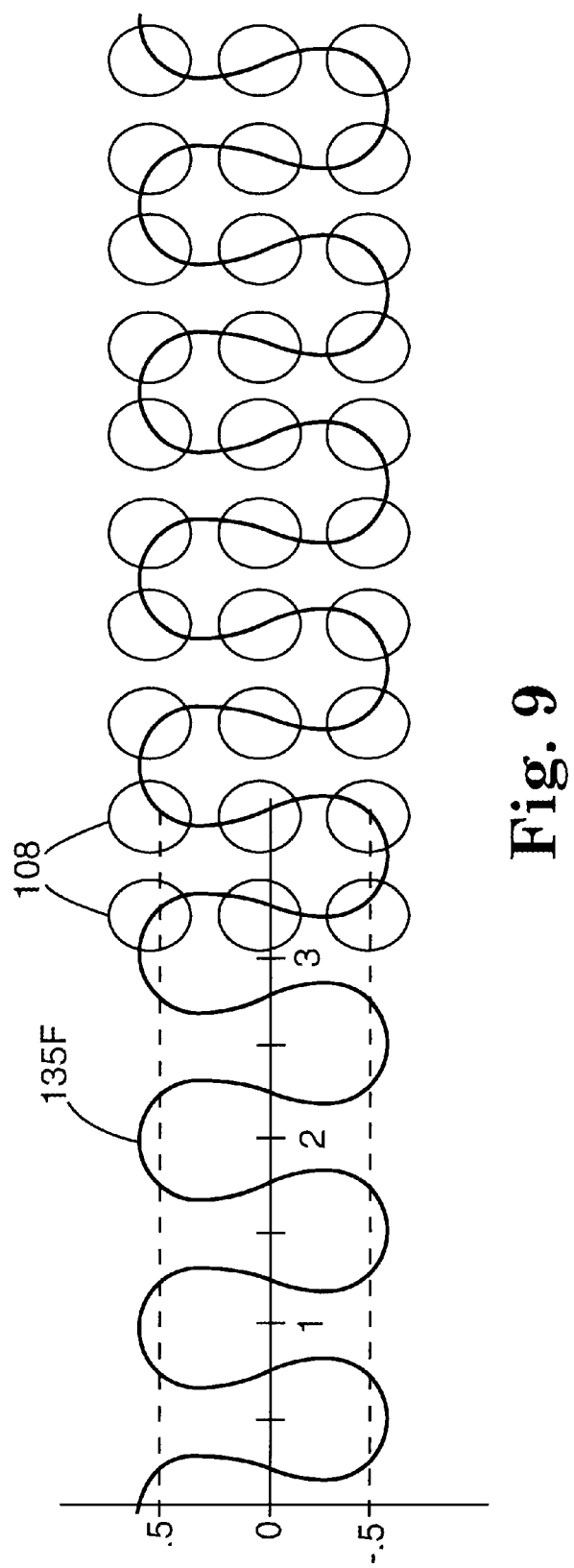
FIG. 9 is a diagram of a Lissajous wave periodic emitter trajectory having an omega wave shape produced according to the present invention.
Figure 10:
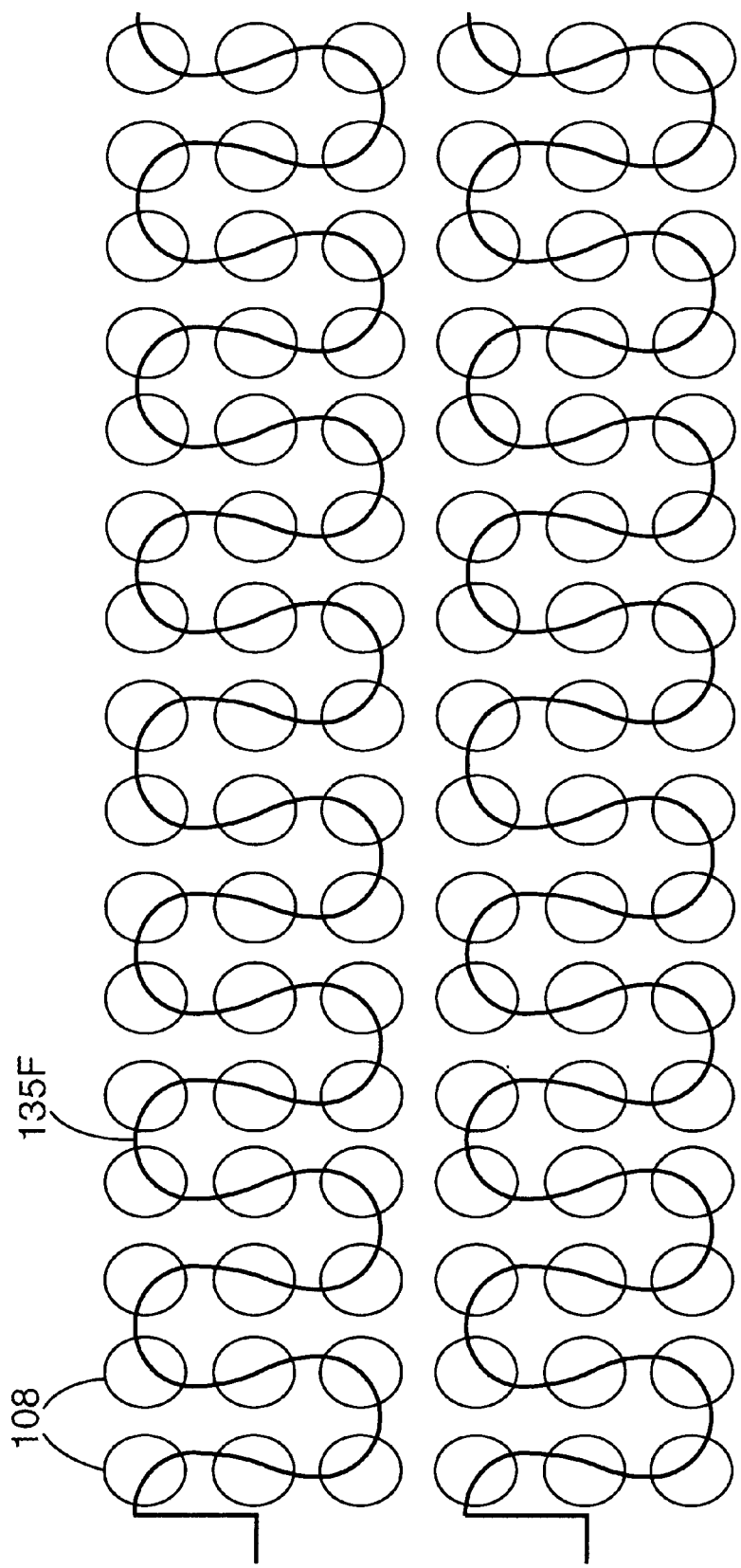
FIG. 10 is a diagram of a rectangular grid of storage areas accessible by using the omega wave periodic trajectory of FIG. 9.

FIG. 8 is a diagram of a "figure-8" Lissajous curve 135E produced according to the present invention. When the periodic sinusoidal motion produced by generators 110E and 110F is combined with constant velocity motion along one dimension, such as the X-direction, a periodic emitter trajectory 135F, referred to herein as a "Lissajous wave," is produced. FIG. 9 shows a Lissajous wave 135F produced from the Lissajous curve 135E of FIG. 8. The example Lissajous wave 135F of FIG. 9 is called an "omega wave," named for the alternating series of upright and inverted omega-shaped curves that form the trajectory. The graphed omega wave trajectory 135F of FIG. 9 shows a grid of available storage areas 108 marked with an "O" symbol at equal time (phase) intervals. As shown in FIG. 10, with appropriate read/write timing, a rectangular grid of available storage areas 108 having uniform spacing in the X and Y directions may be accessed, even though the X and Y emitter motions are sinusoidal functions of time.

Although the omega wave example of the Lissajous wave periodic trajectory presented with reference to FIGS. 8–10 utilizes separate single-frequency signals to drive X and Y axis movements, Lissajous wave trajectories are not limited to such single-frequency signals. Lissajous wave periodic trajectories include all trajectories wherein, in the absence of linear motion in the X and Y directions, separate X and Y signals cause the emitter to repeatedly trace a closed path. Signals that separately control X and Y motions in a Lissajous wave may consist of one, or more than one frequency, as long as all such component frequencies, whether controlling X or Y motions, are commensurable. Two frequencies are commensurable if their ratio forms a rational number. Driving one or both X and Y axes with multi-frequency signals (which may include higher harmonic frequencies) provides greater design control of Lissajous wave trajectories, and may be used to increase the straightness of portions of the trajectory shape, to increase the uniformity of emitter velocity along portions of the trajectory, or to provide other trajectory enhancements.

Figure 11:
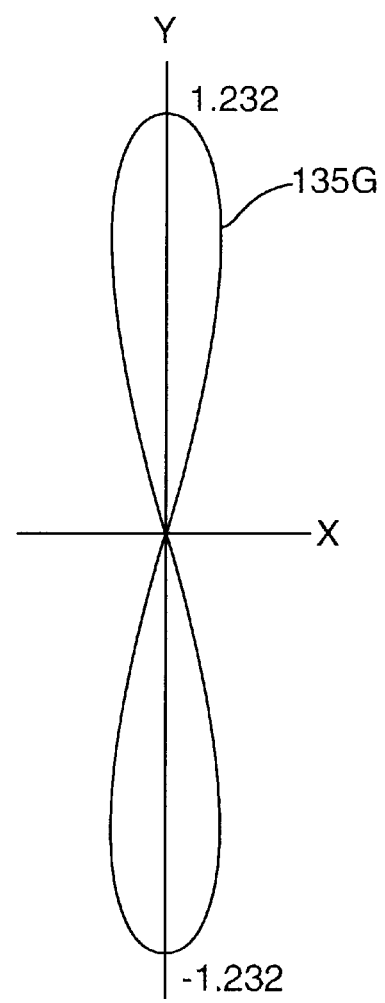
FIG. 11 is a diagram of an improved "figure-8" Lissajous curve, enhanced by the addition of higher harmonic frequencies to both X and Y dimensions according to the present invention.

FIG. 11 is a diagram of an enhanced "figure-8" Lissajous curve 135G, improved by the addition of higher harmonic frequencies to both X and Y signals generated by generators 110E and 110F. FIG. 11 shows the emitter path in the absence of linear emitter motion in the X or Y direction. In this example, a second harmonic was added to the X signal and a third harmonic was added to the Y signal. A comparison of FIG. 11 with FIG. 8 illustrates the increased linearity that results from the added harmonic components. Greater uniformity of emitter velocity is also achieved.

Figure 12:
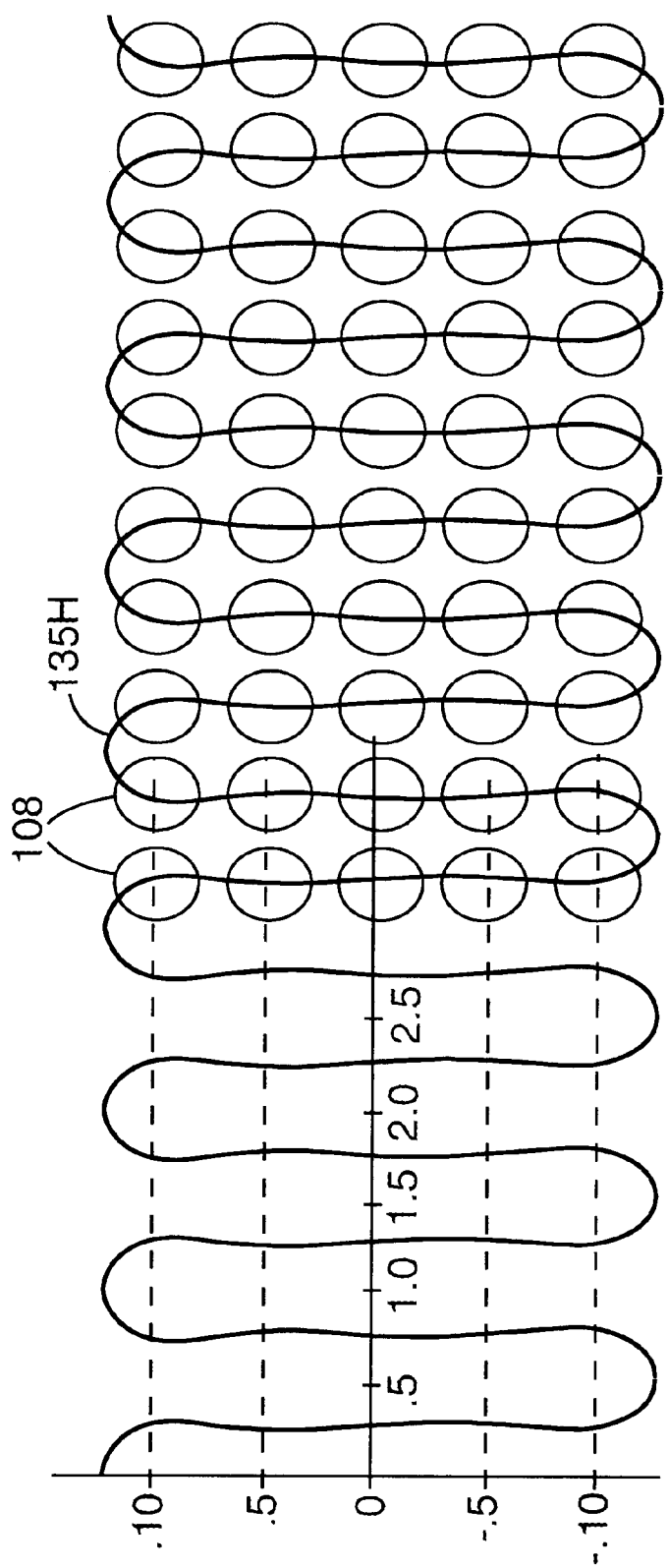
FIG. 12 is a plot of a multiple-frequency omega wave periodic trajectory produced using the multiple-frequency curve of FIG. 11.

FIG. 12 is a plot of a multiple-frequency omega wave periodic trajectory 135H produced using the multiple-frequency curve 135G of FIG. 11. The multiple-frequency Lissajous curve 135G of FIG. 11, when combined with a constant velocity movement in the X direction produces a Lissajous wave periodic trajectory 135H that is an enhancement of the omega wave periodic trajectory 135F of FIG. 9, and which is called a "multiple-frequency omega wave" periodic trajectory. Note that the multiple-frequency omega wave trajectory 135H of FIG. 12 somewhat resembles a rectangle wave in shape, and that the differences between the two shapes can be made arbitrarily small with the addition of appropriate higher frequency components (although there is little motivation to actually do so, since achieving square corners provides no additional benefit but requires added cost and complexity).

It should be emphasized that the particular multiple-frequency omega waves 135G and 135H illustrated by FIGS. 11 and 12 is but one of many possible configurations, and that although this example uses one added harmonic frequency for each direction (X and Y) and provides for 10 storage areas 108 to be accessed during each cycle of the trajectory, other configurations might use differing numbers of frequencies and provide for differing numbers of accessible storage areas 108 per cycle. In addition to benefits derived from the previously disclosed omega wave trajectory 135F, the multiple-frequency omega wave trajectory 135H provides increased flexibility in positioning storage areas 108, and the ability to access more storage areas 108 per cycle (such as for increased resolution).

Although Lissajous wave periodic trajectory movement methods are described herein by reference to emitter motions in the X and Y directions and by reference to example trajectories that approximate rectangle wave shapes, other variations are possible that make use of emitter motions that are not aligned in the X and Y directions and/or which produce trajectories that do not approximate rectangle wave shapes.

Further, although FIGS. 4–5, 6–7, 8–10, and 11–12 depict four preferred embodiments of a periodic emitter trajectory 135 of the present invention (namely, the triangle wave, sawtooth wave, omega wave, and multiple-frequency omega wave periodic trajectory methods), it is worth repeating that these methods are only four solutions in a design space whose variables include X and Y amplitude, phase and frequency content, read/write timing, and linear motion along the X and Y directions. As such, it should be noted that other methods may be used.

Figure 13:
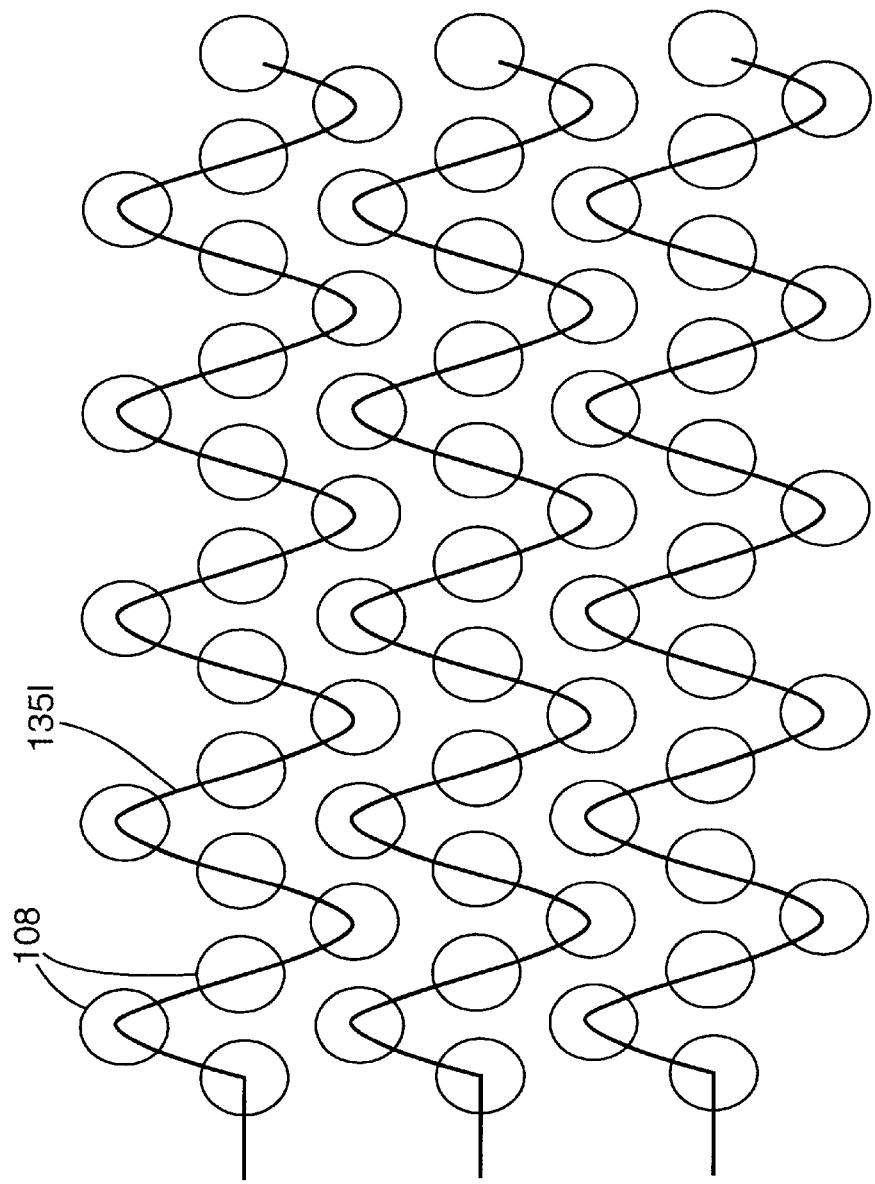
FIG. 13 is a diagram of an alternative embodiment sinusoidal wave periodic trajectory, and a parallelogram grid of storage areas.

FIG. 13 is a diagram of an alternative embodiment sinusoidal wave periodic trajectory 135I, and a parallelogram grid of storage areas 108. The sinusoidal wave periodic trajectory 135I is produced by generating a sinusoidally varying signal in the Y direction at a single frequency equal to ¼th the read/write frequency, combined with constant motion in the X direction. As in previous plots, "O" marks indicate available storage locations 108.

Figure 14:
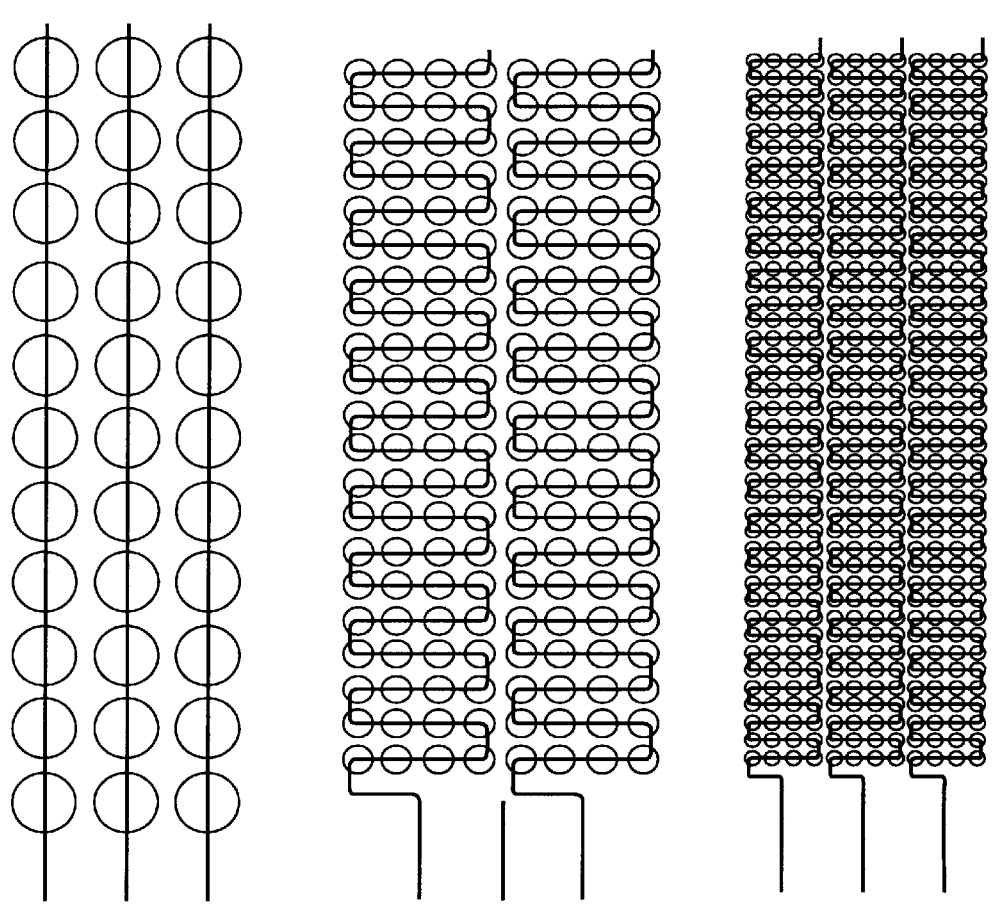
FIG. 14 shows examples of differing resolution modes and multiple rows of storage areas attainable with the present invention periodic trajectories.

FIG. 14 shows examples of differing resolution modes and multiple rows of storage areas 108 attainable with the present invention periodic trajectories 135. The trajectories 135 shown in FIG. 14 are multiple-frequency omega waves. The size of the omega waves may be changed, and the read/write timing may be changed, to access any desired number of storage areas 108 during each cycle.

In one embodiment, writing is accomplished by temporarily increasing the power density of the electron beam current to modify the surface state of the storage area 108. Reading is accomplished by measuring the effect of storage area 108 on the electron beams, or the effect of the electron beams on the storage area 108. For example, a storage area 108 that has been modified can represent a bit 1, and a storage area 108 that has not been modified can represent a bit 0, and vice versa. In fact, storage area 108 can be modified to different degrees to represent more than two bits. Some modifications may be permanent, and some modifications may be reversible. The permanently modified storage medium is suitable for write-once-read-many memory (WORM).

In one embodiment, the structure of the storage area 108 is altered in such a way as to vary its secondary electron emission coefficient (SEEC), its back-scattered electron coefficient (BEC), or the collection efficiency for secondary or back-scattered electrons emanating from storage area 108. The SEEC is defined as the number of secondary electrons generated from the medium for each electron incident onto the surface of the medium. The BEC is defined as the fraction of the incident electrons that are scattered back from the medium. The collection efficiency for secondary/back-scattered electrons is the fraction of the secondary/back-scattered electrons that is collected by an electron collector, typically registered in the form of a current.

Reading is accomplished by collecting the secondary and/or back-scattered electrons when a lower power density electron beam is applied to storage medium 106. During reading, the power density of the electron beam should be kept low enough so that no further writing occurs.

One embodiment of storage medium 106 includes a material whose structural state can be changed from crystalline to amorphous by electron beams. The amorphous state has a different SEEC and BEC than the crystalline state, which leads to a different number of secondary and back-scattered electrons being emitted when the low power density electron beam is applied to the storage area. By measuring the number of secondary and back-scattered electrons emitted, the state of the storage area can be determined. To change the material from the amorphous to crystalline state, the electron beam power beam power density is first increased and then slowly decreased. This process heats the amorphous and then slowly cools it so that the area has time to anneal into its crystalline state. To change the material from crystalline to amorphous state, the beam power density is increased to a high level and then rapidly decreased. To read from the storage medium, a lower-energy beam is focused on a desired storage area. An example of such a type of material is germanium telluride (GeTe) and ternary alloys based on GeTe. Similar methods to modify states using laser beams as the heating source have been described in "Laser-induced Crystallization of Amorphous GeTe: A Time-Resolved Study," by Huber and Marinero, published in Physics Review B 36, page 1595, in 1987, and will not be further described here.

Other methods can also be used to induce a state change in storage medium 106. For example, a change in the topography of the medium, such as a hole or bump, will modify the SEEC and BEC of the storage medium. This modification occurs because the coefficients typically depend on the incident angle of the electron beam onto the storage area. Changes in material properties, band structure, and crystallography may also affect the coefficients. Also, the BEC depends on an atomic number, Z. Thus, one embodiment of a storage medium has a layer of low Z material on top of a layer of high Z material or vice versa, with writing accomplished through ablating some of the top layer with an electron beam.

Figure 15:
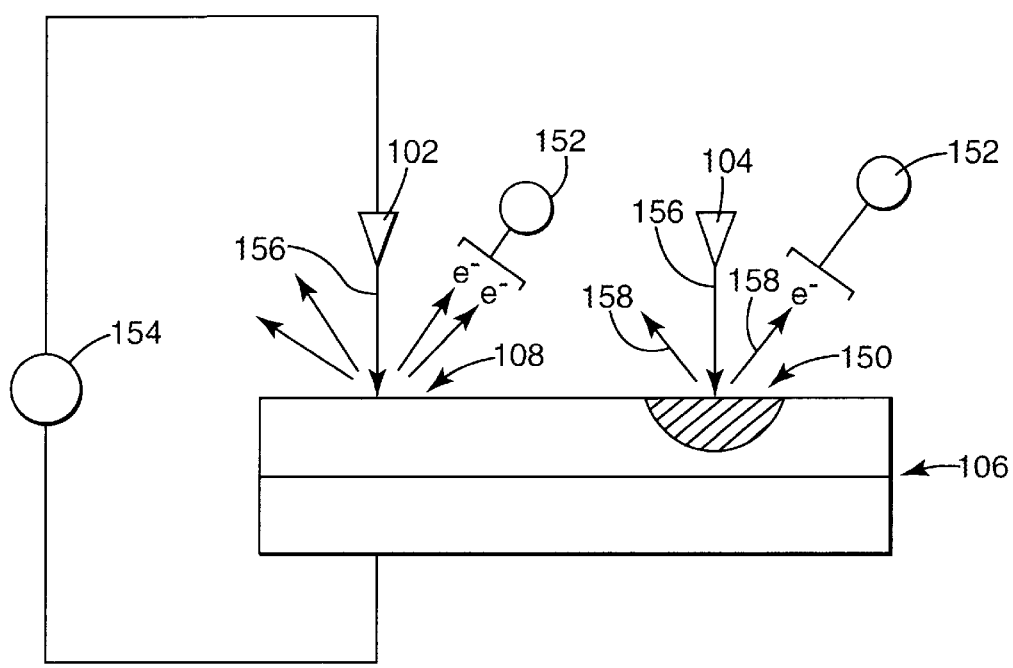
FIG. 15 is a diagram illustrating field emitters reading from storage areas in one embodiment of a storage device according to the present invention.

FIG. 15 schematically shows field emitters 102 and 104 reading from storage medium 106. The state of storage area 150 has been altered, while the state of storage area 108 has not been altered. As illustrated in FIG. 15, when a low-energy electron beam 156 strikes storage area 150, secondary and back-scattered electrons 158 are created. The secondary and back-scattered electrons 158 are then collected by electron collectors 152. An area that has been modified, such as storage area 150, will produce a different number of secondary electrons and back-scattered electrons 158, as compared to an area that has not been modified, such as storage area 108. The difference may be more or may be less depending on the type of material and the type of modification. By monitoring the magnitude of the signal current collected by electron collectors 152, the state of the storage area, and thus the bit stored, can be identified.

Field emitters may be noisy with the magnitude of the electron beam current varying with respect to time. Moreover, the gap distance between the tips of the emitters and the surface of the storage medium may vary. If the information stored were based on tunneling current, then the gap distance may be extremely crucial. However, the present invention does not depend directly on the emitted electron beam current, but rather on the effect of the beam. At least two methods may be used to alleviate the problem of the emitters being noisy. The first method is to connect a constant current source 154 to field emitter 102. Constant current source 154 controls the power density of electron beam 156. Although this method would not help storage techniques using the magnitude of the field emitted current as the signal, this method reduces the field emitter noise significantly. Another way to alleviate the field-emitter noise is to separately measure the emitted electron beam current and use it to normalize the signal current. As the electron beam current varies, the signal current varies correspondingly. On the other hand, the normalized signal current remains the same to indicate the state of the storage area.

Figure 16:
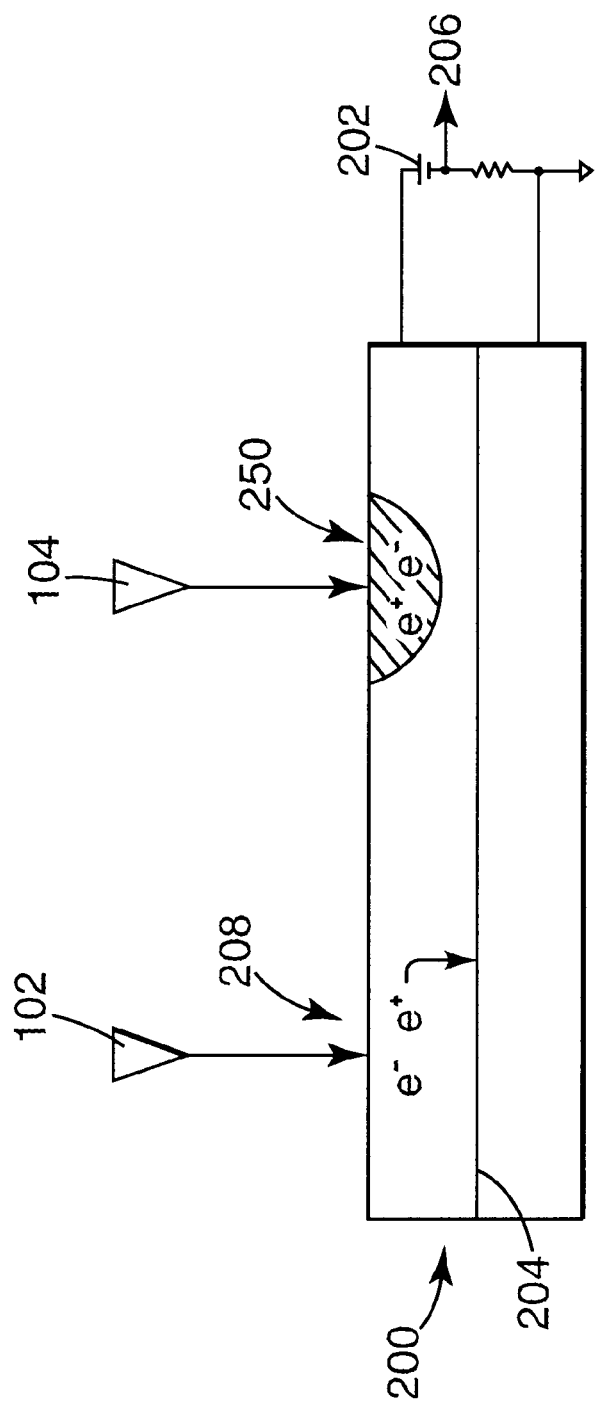
FIG. 16 is a diagram illustrating a storage medium in one embodiment based on a diode structure.

FIG. 16 shows another preferred embodiment, known in the present description as the preferred "Diode" approach. In this approach, the storage medium is based on a diode structure 200, which can be a pn junction or a Schottky barrier or any other type of "electronic valve". The basic idea is to store bits by locally altering the surface of a diode in such a way that the collection efficiency for minority carriers generated near the altered region is different from that of an unaltered region. The collection efficiency for minority carriers is defined as the fraction of minority carriers generated by the incident electrons that is swept across the diode junction 204 when it is biased by an external circuit 202, causing a signal current 206 to flow in the external circuit. The external circuit 202 shown just serves as an example of the concept. The actual external circuit may be different, but still provides a bias across the junction and measures the current across the junction.

In FIG. 16, field emitters 102 and 104 emit narrow beams of electrons onto the surface of diode 200. The incident electrons excite electron-hole pairs near the surface of the diode. The diode is reversed-biased by an external circuit 202 so that the minority carriers that are generated by the incident electrons are swept toward the diode junction 204. Electrons that reach the pn junction 204 will be swept across the junction 204. In other words, minority carriers that do not recombine with majority carriers before reaching the junction are swept across the junction, causing a current to flow in the external biasing circuit 202.

Writing onto the diode 200 is accomplished by increasing the power density of the electron beam enough to locally alter some property of the diode. The alteration will affect the number of minority carriers swept across the junction 204 when the same area is irradiated with a lower power density "read" electron beam. For example, the recombination rate in a written area 250 could be increased relative to an unwritten area 208 so that the minority carriers generated in the written area have an increased probability of recombining with majority carriers before they have a chance to reach and cross the junction 204. Hence, a smaller current flows in the external circuit 202 when the read electron beam is incident upon a written area than when it is incident upon an unwritten area. Conversely, it is also possible to start with a diode structure with a high recombination rate, and to write bits by locally reducing the recombination rate. The magnitude of the current resulting from the minority carriers depends on the state of the storage area; and the current constitutes the output signal 206 to indicate the bit stored.

Figure 17A:
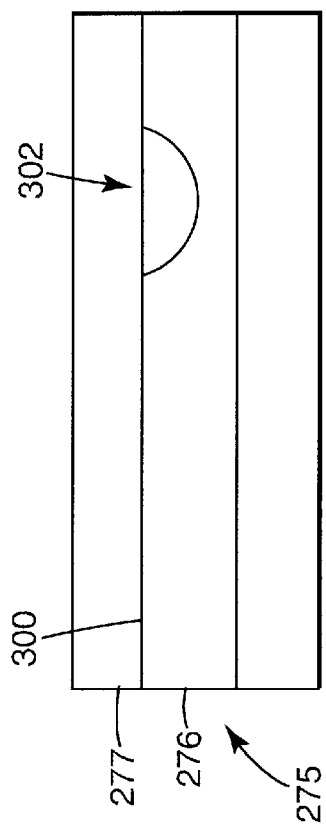
FIGS. 17A and 17B are diagrams illustrating additional embodiments of storage devices with storage mediums based on alternative diode structures.
Figure 17B:
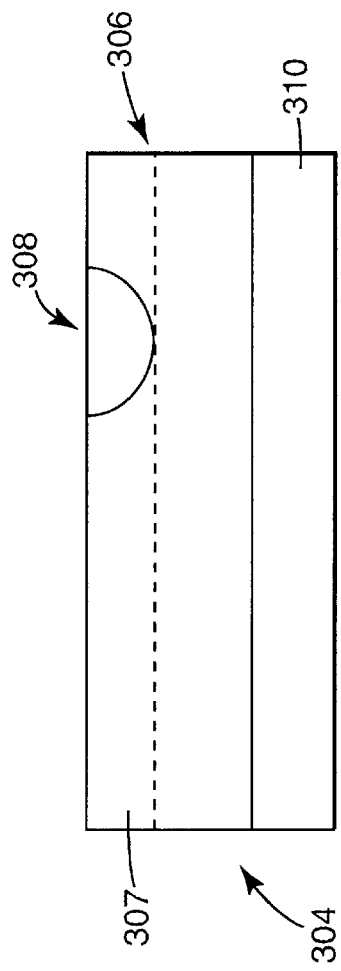

FIGS. 17A and 17B show different preferred diode structures as storage media in the present invention. FIG. 17A shows a diode structure 275 with a gain layer 276, and a "poor" oxide layer 277 on top of gain layer 276. "Poor" here means the interface or boundary 300 between the oxide 277 and the diode 275 has a high surface recombination rate. One example of such a diode is a silicon pn junction with a poor thermal oxide on its top surface. The interface 300 can be passivated with hydrogen to reduce its surface recombination rate. Electron beams may be used to heat up an area 302 of the hydrogenated interface to increase the recombination rate by either driving away the hydrogen or introducing defects. Methods to passivate recombination sites at a silicon/thermal oxide interface by hydrogenation are known in the art and will not be further described here.

FIG. 17B shows a pn junction diode structure 304 with either the p or the n layer as the top layer 306. Either all, or just the top surface 307, of the top layer 306 consists of hydrogenated amorphous silicon that is doped to be consistent with the doping of the rest of the top layer 306, which consists of crystalline silicon. The surface of the hydrogenated amorphous silicon layer 306 can be easily damaged by bombarding it with an electron beam. Such damage in a storage area 308 can introduce defects in the hydrogenated amorphous silicon layer that act as recombination sites increasing the recombination rate. The damage can be reversible by heating. Thus, one can have a bulk erase by resistively heating the entire storage medium. The building of such a diode can be found in "Electron-Beam-Induced Information Storage in Hydrogenated Amorphous Silicon Devices," by Yacobi, published in J. of Appl. Phys. Lett. 44, page 695, in 1984, and will not be further described here.

FIG. 17B can also be used to show another preferred diode structure, with the layer 306 being a phase-change material, such as a layer of germanium telluride, GeTe, which can be reversibly changed from a semiconducting (amorphous) to a metallic (crystalline) state by heating and cooling it at the proper rate. Thus, for example, if the GeTe is doped so that it is p-type when in its semiconducting state and is deposited on top of a n-type semiconductor layer 310, then a large contrast will be seen in the number of carriers swept across the junction if the GeTe is changed to its metallic state at the storage area 308.

Figure 18:
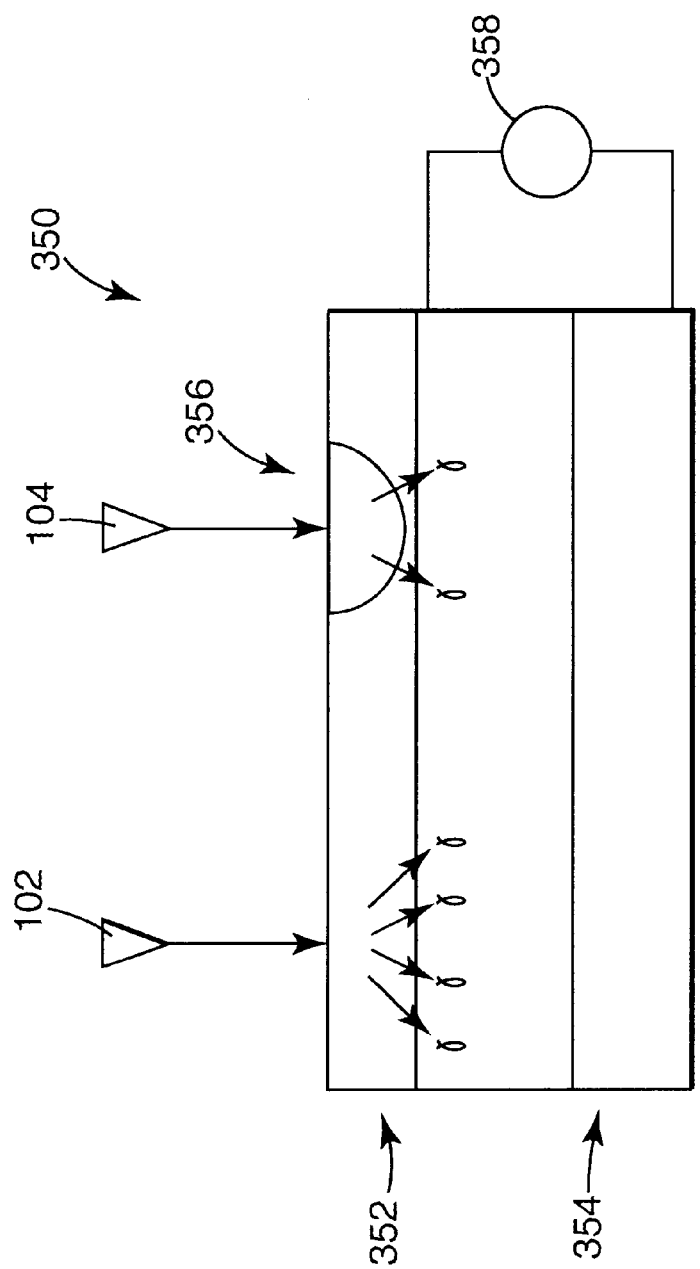
FIG. 18 is a diagram illustrating one embodiment of a storage device with a storage medium based on a fluorescent medium.

FIG. 18 shows another preferred embodiment 350 with a florescent layer 352 on a photodiode structure 354. Information is stored by using the field emitters to locally alter the light emitting properties of the florescent layer. The alteration changes the number of photons emitted by the florescent layer 352 and received by the photodiode 354 for each incident electron. Such changes can be carried out by striking a storage area 356 with an electron beam current with high enough power density to heat the storage area 356 to a high temperature. Most florescent materials are easily damaged by such heating. This damage increases the relative number of non-radiative recombination centers to radiative recombination centers so that the number of photons emitted by the florescent material for each incident electron is reduced. Alternatively, high energy electrons can be used to similarly alter the florescent material. In the read mode, an electron beam current with a lower power density is used to ensure that no further writing occurs. A meter 358 measures the current across the photodiode, which depends on the number of photons received by the photodiode and provides indication as to whether the storage area is altered or not. One possible example for the florescent layer is zinc oxide. The methods to build a florescent layer onto a photodiode should be known in the art and will not be further described here.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A storage device comprising:
    a field emitter generating an electron beam current;
    a storage medium in close proximity to the field emitter, the storage medium having a plurality of storage areas for storage of information, each of the plurality of storage areas being in one of a plurality of states to represent the information stored in that storage area;
    such that:
        an effect is generated when the electron beam current bombards one of the storage areas;
        the magnitude of the effect depends on the state of the bombarded storage area;
        the information stored in the bombarded storage area is read by measuring the magnitude of the effect;
        a micromover for causing a periodic change in the relative positions between the field emitter and the storage medium, thereby generating a periodic field emitter trajectory; and wherein the shape of the periodic field emitter trajectory is one of a triangle wave shape, a sawtooth wave shape, a Lissajous wave shape, a rectangle wave shape, and a sinusoidal wave shape.

2. The storage device recited in claim 1, wherein the micromover causes movement of the field emitter.

3. The storage device recited in claim 1, wherein the micromover causes movement of the storage medium.

4. The storage device recited in claim 1, wherein the micromover causes movement of the field emitter and the storage medium.

5. The storage device recited in claim 1, wherein the micromover causes linear changes in the relative positions between the field emitter and the storage medium.

6. The storage device recited in claim 1, wherein at least a portion of the information stored in the storage areas is stored and read using pulse width modulation (PWM).

7. The storage device recited in claim 1, wherein the storage areas are organized into a plurality of rows, and wherein the field emitter accesses a plurality of rows of storage areas in a single scan pass of the field emitter across the storage medium.

8. The storage device recited in claim 1, wherein a substantially rectilinear grid of storage areas is accessed by the field emitter in a single scan pass of the field emitter across the storage medium.

9. A storage device comprising:
    a field emitter generating an electron beam current;
    a storage medium in close proximity to the field emitter, the storage medium having a plurality of storage areas for storage of information, each of the plurality of storage areas being in one of a plurality of states to represent the information stored in that storage area;
    such that:
        an effect is generated when the electron beam current bombards one of the storage areas;
        the magnitude of the effect depends on the state of the bombarded storage area;
        the information stored in the bombarded storage area is read by measuring the magnitude of the effect;
        a micromover for causing a periodic change in the relative positions between the field emitter and the storage medium, thereby generating a periodic field emitter trajectory; and at least one flexure coupled to the storage medium, the flexure contributing to generating the periodic field emitter trajectory.

10. A storage device comprising:
    a field emitter generating an electron beam current;
    a storage medium in close proximity to the field emitter, the storage medium having a plurality of storage areas for storage of information, each of the plurality of storage areas being in one of a plurality of states to represent the information stored in that storage areas;
    such that:
        an effect is generated when the electron beam current bombards one of the storage areas;

the magnitude of the effect depends on the state of the bombarded storage area;

the information stored in the bombarded storage area is read by measuring the magnitude of the effect;

a micromover for causing a periodic change in the relative positions between the field emitter and the storage medium, thereby generating a periodic field emitter trajectory; and at least one flexure coupled to the field emitter, the flexure contributing to generating the periodic field emitter trajectory.

11. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage area;

such that:
an effect is generated when the electron beam current bombards one of the storage areas;

the magnitude of the effect depends on the state of the bombarded storage area;

the information stored in the bombarded storage area is read by measuring the magnitude of the effect;

a micromover for causing a periodic change in the relative positions between the field emitter and the storage medium, thereby generating a periodic field emitter trajectory; and at least one moving stage, and wherein the periodic field emitter trajectory is at a resonant frequency of the moving stage.

12. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage area;

such that:
an effect is generated when the electron beam current bombards one of the storage areas;

the magnitude of the effect depends on the state of the bombarded storage area;

the information stored in the bombarded storage area is read by measuring the magnitude of the effect;

a micromover for causing a periodic change in the relative positions between the field emitter and the storage medium, thereby generating a periodic field emitter trajectory; and a first and a second moving stage, and wherein the periodic field emitter trajectory is at a resonant frequency of the first and the second moving stages.

13. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage areas;

such that:
an effect is generated when the electron beam current bombards one of the storage areas;

the magnitude of the effect depends on the state of the bombarded storage areas;

the information stored in the bombarded storage area is read by measuring the magnitude of the effect;

a micromover for causing a periodic change in the relative positions between the field emitter and the storage medium, thereby generating a periodic field emitter trajectory; and wherein the periodic field emitter trajectory is periodic in only one dimension.

14. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage areas;

such that:
an effect is generated when the electron beam current bombards one of the storage areas;

the magnitude of the effect depends on the state of the bombarded storage area;

the information stored in the bombarded storage area is read by measuring the magnitude of the effect;

a micromover for causing a periodic change in the relative positions between the field emitter and the storage medium, thereby generating a periodic field emitter trajectory; and wherein the periodic field emitter trajectory is periodic in two dimensions.

15. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage areas;

such that:
an effect is generated when the electron beam current bombards one of the storage areas;

the magnitude of the effect depends on the state of the bombarded storage area;

the information stored in the bombarded storage area is read by measuring the magnitude of the effect;

a micromover for causing a periodic change in the relative positions between the field emitter and the storage medium, thereby generating a periodic field emitter trajectory; and wherein the shape of the periodic field emitter trajectory is one of a circle, ellipse, spiral, square, rectangle and FIG. 8.

16. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage areas;

such that:
an effect is generated when the electron beam current bombards one of the storage areas;

the magnitude of the effect depends on the state of the bombarded storage areas;

the information stored in the bombarded storage area is read by measuring the magnitude of the effect;

a micromover for causing a periodic change in the relative positions between the field emitter and the storage medium, thereby generating a periodic field emitter trajectory; and wherein timing of the generation of the electron beam current is based on a phase of the periodic field emitter trajectory.

17. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage areas; such that:
- an effect is generated when the electron beam current bombards one of the storage areas;
- the magnitude of the effect depends on the state of the bombarded storage areas;
- the information stored in the bombarded storage area is read by measuring the magnitude of the effect;
- a micromover for causing a periodic change in the relative positions between the field emitter and the storage medium, thereby generating a periodic field emitter trajectory; and a plurality of field emitters, each being similar to the field emitter recited in claim 1, such that the plurality of field emitters work in parallel to read information from the device, and wherein the micromover causes a periodic change in the relative positions between the plurality of field emitters and the storage medium, thereby generating a plurality of periodic field emitter trajectories.

18. A storage device comprising:
a field emitter generating an electron beam current;
a storage medium in close proximity to the field emitter, the storage medium having a plurality of storage areas for storage of information, each of the plurality of storage areas being in one of a plurality of states to represent the information stored in that storage areas; such that:
- an effect is generated when the electron beam current bombards one of the storage areas;
- the magnitude of the effect depends on the state of the bombarded storage areas;
- the information stored in the bombarded storage area is read by measuring the magnitude of the effect;
- a micromover for causing a periodic change in the relative positions between the field emitter and the storage medium, thereby generating a periodic field emitter trajectory; and wherein the periodic motion is provided by a micromover exciting at least one flexure.

19. The method of accessing information recited in claim 18, wherein the generating periodic motion step includes moving the field emitter.

20. The method of accessing information recited in claim 18, wherein the generating periodic motion step includes moving the storage medium.

21. The method of accessing information recited in claim 18, wherein the generating periodic motion step includes moving the storage medium and the field emitter.

22. The method of accessing information recited in claim 18, and further comprising generating linear movement of the field emitter with respect to the storage medium.

23. The method of accessing information recited in claim 18, wherein the periodic motion is periodic in only one dimension.

24. The method of accessing information recited in claim 18, wherein the periodic motion is periodic in two dimensions.

25. The method of accessing information recited in claim 18, wherein at least a portion of the information stored in the storage areas is stored using pulse width modulation (PWM).

26. The method of accessing information recited in claim 18, wherein the storage areas are organized into a plurality of rows, the method further comprising:
accessing a plurality of rows of storage areas in a single scan pass of the field emitter across the storage medium.

27. The method of accessing information recited in claim 18, wherein a substantially rectilinear grid of storage areas is accessed by the field emitter in a single scan pass of the field emitter across the storage medium.

28. The method of accessing information recited in claim 18, wherein timing of the generation of the electron beam current is based on a phase of the periodic motion.

29. A storage device comprising:
a field emitter generating an electron beam current;
a storage medium in close proximity to the field emitter, the storage medium having a plurality of storage areas for storage of information, each of the plurality of storage areas being in one of a plurality of states to represent the information stored in that storage area; such that:
- an effect is generated when the electron beam current bombards one of the storage areas;
- the magnitude of the effect depends on the state of the bombarded storage areas;
- the information stored in the bombarded storage area is read by measuring the magnitude of the effect;
- a micromover for causing a periodic change in the relative positions between the field emitter and the storage medium, thereby generating a periodic field emitter trajectory; and wherein the generating periodic motion step includes generating periodic motion at a resonant frequency.

30. A storage device comprising:
a field emitter generating an electron beam current;
a storage medium in close proximity to the field emitter, the storage medium having a plurality of storage areas for storage of information, each of the plurality of storage areas being in one of a plurality of states to represent the information stored in that storage areas; such that:
- an effect is generated when the electron beam current bombards one of the storage areas;
- the magnitude of the effect depends on the state of the bombarded storage area;
- the information stored in the bombarded storage area is read by measuring the magnitude of the effect;
- a micromover for causing a periodic change in the relative positions between the field emitter and the storage medium, thereby generating a periodic field emitter trajectory; and wherein the shape of the periodic motion is one of a circle, ellipse, spiral, square, rectangle, and FIG. 8.

31. A storage device comprising:
a field emitter generating an electron beam current;
a storage medium in close proximity to the field emitter, the storage medium having a plurality of storage areas for storage of information, each of the plurality of storage areas being in one of a plurality of states to represent the information stored in that storage areas; such that:
- an effect is generated when the electron beam current bombards one of the storage areas;
- the magnitude of the effect depends on the state of the bombarded storage areas;
- the information stored in the bombarded storage area is read by measuring the magnitude of the effect;
- a micromover for causing a periodic change in the relative positions between the field emitter and the storage medium, thereby generating a periodic field emitter trajectory; and wherein the shape of the periodic motion is one of a triangle wave shape, a sawtooth wave shape, a Lissajous wave shape, a rectangle wave shape, and a sinusoidal wave shape.

32. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage areas;

such that:
- an effect is generated when the electron beam current bombards one of the storage areas;
- the magnitude of the effect depends on the state of the bombarded storage areas;
- the information stored in the bombarded storage area is read by measuring the magnitude of the effect;
- a micromover for causing a periodic change in the relative positions between the field emitter and the storage medium, thereby generating a periodic field emitter trajectory; and
- generating a plurality of electron beam currents with a plurality of field emitters, each electron beam current directed toward one of the plurality of storage areas on the storage medium;
- detecting an effect in each of the storage areas caused by the electron beam current directed at that storage area, the effects based on the state of the storage areas; and
- generating periodic motion of each of the field emitters relative to the storage medium.

33. A storage device comprising:

a field emitter generating an electron beam current;

a storage medium in close proximity to the field emitter, the storage medium having a plurality of storage areas for storage of information, each of the plurality of storage areas being in one of a plurality of states to represent the information stored in that storage area, the information stored in a storage area being read by bombarding the storage area with the electron beam current and measuring an effect generated by the bombardment;

a moving stage including at least one flexure; and a controller for causing a periodic movement of the moving stage, and thereby causing a periodic change in the relative positions between the field emitter and the storage medium.

* * * * *